Figure 1:
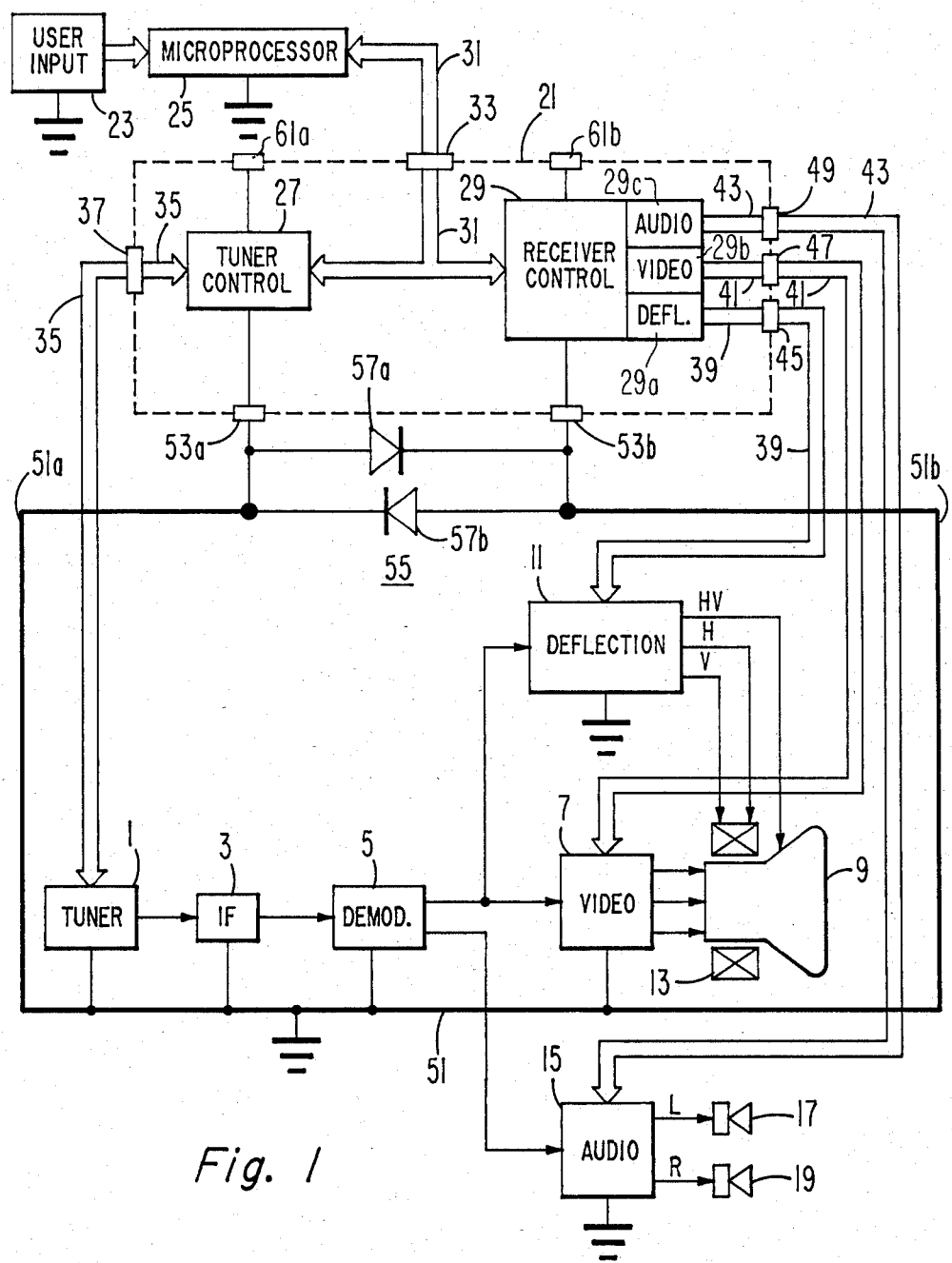

United States Patent [19]

Testin

[11] Patent Number: 4,636,867
[45] Date of Patent: Jan. 13, 1987

[54] GROUNDING ARRANGEMENT USEFUL IN A DISPLAY APPARATUS

[75] Inventor: William J. Testin, Marion County, Ind.

[73] Assignee: RCA Corporation, Princeton, N.J.

[21] Appl. No.: 792,788

[22] Filed: Oct. 30, 1985

[51] Int. Cl.<sup>4</sup> .............................................. H04N 5/44
[52] U.S. Cl. ................................... 358/245; 307/549; 361/56; 361/91
[58] Field of Search ............... 358/245, 192.1; 361/56, 361/91; 307/540, 549

[56] References Cited

U.S. PATENT DOCUMENTS

| 4,340,922 | 7/1982 | Delaporte | 361/56 |
| 4,375,661 | 3/1983 | Savic | 358/245 |
| 4,398,106 | 8/1983 | Davidson | 307/549 |

OTHER PUBLICATIONS

Electrical Schematic Ignition Interrupt Driver–Drawing No. 12258888.
The document entitled, "Plessy Semiconductors Preliminary Information–XP500 Single Chip Frequency Synthesizer", dated Aug. 82, by Plessy Semiconductors Limited, Wiltshire, United Kingdom.

Primary Examiner—Howard W. Britton
Attorney, Agent, or Firm—Eugene M. Whitacre; Paul J. Rasmussen; Peter M. Emanuel

[57] ABSTRACT

The control unit for a display system is partitioned into first and second interconnected control units so as to permit respective separate ground terminals to be utilized. The separate ground terminals allow stable grounding for sensitive circuits in each of the control units without the formation of a continuous, closed ground loop which would be susceptible to disturbances due to ground currents induced from the magnetic field of the deflection unit of the display system. A theshold responsive gate is coupled between the separate ground terminals to inhibit excessively large and potentially damaging voltages due to picture tube discharges from being developed between the ground terminals.

8 Claims, 2 Drawing Figures

GROUNDING ARRANGEMENT USEFUL IN A DISPLAY APPARATUS

The present invention concerns a grounding arrangement which is particularly useful in a display system such as a television receiver, monitor or similar apparatus.

Modern display systems such as television receivers and monitors offer a large number of user features usually requiring control units which are connected to almost all of the major signal processing units such as the tuner, video, audio and deflection units. In such arrangements, care should be taken in arranging the extensive reference potential or ground paths to inhibit unwanted currents and voltages, which may adversely affect the operation of the display system, from being developed in the reference potential or gound paths due to the operation of the signal processing units.

An aspect of the present invention concerns the recognition that the magnetic fields produced by the deflection unit of a display system can induce large currents in closed loop reference potential or ground paths which in turn can cause disturbances of the reference potentials with respect to which signals are processed in various portions of the display system.

In a preferred embodiment of the present invention, a control system having first and second interconnected control units for controlling different signal processing portions of an apparatus such as a television receiver or monitor is provided with first and second unconnected reference potential input points for receiving a reference potential from different points of a reference potential (e.g., ground) bus so as to form a reference potential distribution arrangement without a continuous, closed loop subject to magnetically induced currents such as may be produced by a deflection unit. A threshold responsive gate is coupled between the reference potential input points of the first and second control units for selectively connecting or clamping them together when the potential difference between them exceeds a threshold to inhibit excessively large and possibly damaging potential differences from being developed, e.g., due to high voltage discharges of an associated display tube.

Figure 1A:
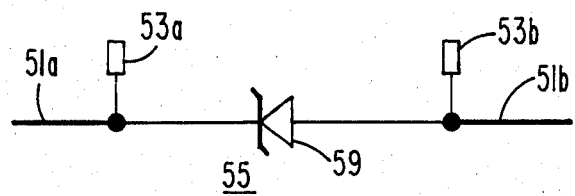

By way of example, the invention will be explained with respect to the accompanying Drawing in which:

FIG. 1 shows partly in block form and partly in schematic form a television receiver incorporating the preferred embodiment of the invention; and FIG. 1A shows in schematic form a modification to the preferred embodiment of the invention shown in FIG. 1.

In the Drawing, multiconductor signal paths are indicated by double lines.

The television receiver shown in FIG. 1 includes a tuner 1 for tuning the RF television signal corresponding to a selected channel to form a corresponding IF signal. The IF signal is filtered by an IF filter 3 and demodulated by a demodulator 5 to produce baseband composite video and audio signals. The composite video signal is coupled to a video processing unit 7 which processes the luminance and chrominance components of the video signal to produce red (R), green (G) and blue (B) drive signals for respective electron guns of a picture tube 9. The video signal is also coupled to a deflection processing unit 11 which processes the synchronization components of the video signal to produce horizontal (H) and vertical (V) deflection signals which are coupled to deflection coils 13 associated with picture tube 9 for deflecting the electron beams produced by the electron guns of picture tube 9. Operating voltages for the receiver including a high voltage (HV) for picture tube 9 are also developed by deflection processing unit 11. The audio signals produced by demodulator 5 are coupled to an audio processing unit 15 which provides left (L) and right (R) stereo signals to speakers 17 and 19.

Various functions of the receiver performed by the processing units so far described are controlled by a control unit 21 in response to user commands provided by means of a user input unit 23 and communicated to control unit 21 by a microprocessor 25. User input unit 23 may comprise a keyboard mounted on the receiver itself or on a remote control transmitter coupled through an infra-red or ultrasonic link to the receiver. The commands for user input unit 23 are in the form of digitally encoded signals and microprocessor 25 decodes these encoded signals and generates further digitally encoded signals for control unit 21 which generates the actual control signals for controlling the various processing units.

Control unit 21 desirably is incorporated in a signal integrated circuit (indicated by the dashed line), e.g., utilizing CMOS technology, which is partitioned into a first control unit 27 for controlling tuner 1 and a second control unit 29 for controlling other processing units of the receiver including video processing unit 7, deflection processing unit 11 and audio processing unit 15. The reasons for the partitioning will be explained below. Microprocessor 25 is coupled to first or tuner control unit 27 and to second or receiver control unit 29 through a data bus 31, the conductors or which are connected to respective terminals (generally indicated by a rectangle 33) of control unit 21. Tuner control unit 27 and receiver control unit 29 are electrically interconnected by data bus 31.

Tuner control unit 27 generates a tuning control signal and bandswitching signals for tuner 1 to tune a selected one of the plurality of RF television signals being received corresponding to respective channels. Tuner control unit 27 is coupled to tuner 1 through a control bus 38, the conductors of which are connected to respective terminals (generally indicated by a rectangle 37) of control unit 21. Tuner control unit 27 may comprise a frequency synthesizer or phase locked loop described, e.g., in U.S. Pat. No. 4,405,947 issued in the name of J. Tults. and M. P. French on Sept. 20, 1983. A phase locked loop receives a frequency divided version of the local osciallator signal generated within the tuner (and therefore) control bus 35 between tuner control unit 27 and tuner 1 has an arrow at both ends) and compares it with reference frequency signal to generate frequency error pulses, the amplitude and duration of which represent the deviation between the actual frequency of the local oscillator signal and the desired frequency. These error pulses are filtered by a lowpass filter to generate a tuning voltage for the local oscillator. Since control unit 21 uses primarily digital components, the lowpass filter required for a phase locked loop is desirably located in tuner 1.

Receiver control unit 29 is partitioned into deflection, video and audio control portions 29a, 29b and 29c for generating control signals for deflection, video and audio signal processing units 11, 7 and 15, respectively. Deflection, video and audio control units 29a, 29b and 29c are coupled to deflection, video and audio processing units 11, 7 and 15 by respective control buses 39, 41 and 43 and terminals (generally indicated by rectangles 45, 47 and 49) of control unit 21.

By way of example of the various functions controlled by receiver control unit 29, deflection control portion 29a generates "receiver on" and "receiver off" control signals for causing deflection processing unit 11 to provide or not provide operating voltages for various portions of the receiver. For this purpose, deflection control portion 29a may include a flip-flop which is set and reset in response to user initiated commands from user input 23 and coupled to control unit 21 by way of microprocessor 25 and data bus 31.

Video control portion 29b generates control signals for controlling the brightness and contrast produced by picture tube 9. For this purpose, video control portion 29b may include digital-to-analog converters (DACs) for generating control voltages for the brightness and contrast functions in response to user initiated command signals. Since control unit 29 primarily includes digital components, the filters for the DACs are desirably included in video processing unit 7. Video control unit 29c may also provide character respresentative control signals to video processing unit 7 for causing alphanumeric or other graphic material to be displayed, e.g., for indicating the selected channel number and/or the time of day. For this purpose, video processing unit 29 may include a character generator of the type described in U.S. Pat. No, 3,984,828 issued in the name of B. W. Beyers, on Oct. 5, 1976. As a further example, video control portion 29b may generate a control signal for controlling a switching unit within video processing unit 7 for selecting either the red, green and blue signals produced in response to the video signal supplied by demodulator 5 or red, green and blue signals provided by an external source such as a home computer or video game.

Audio control portion 29c may include a DAC for controlling the volume level. It may also generate a control signal for selecting either monophonic or stereophonic sound reproduction.

U.S. Pat. No. 4,249,089 issued in the names of J. J. Wolford and J. B. George on Feb. 3, 1981 discloses the arrangement of an integrated circuit with provision including a flip-flop and a DAC for controlling the on/off state and volume level, respectively, of a television receiver. Similar DAC arrangements can be used for controlling brightness and contrast.

Television receivers of the CTC-131 chassis type manufactured by RCA Corporation, Indianapolis, Ind. and described in RCA Color Television Basic Service Data file 1984, CTC 131 Second Edition provide similar and additional control function.

The various information signal voltages processed in tuner 1, IF unit 3, demodulator 5, video processing unit 7, deflection processing unit 11 and audio processing unit 15 and the various control signal voltages generated by control unit 21 (as well as the command and data signal voltages processed by user input unit 23 and microprosessor 25) are referenced to a common reference potential, e.g., ground as shown in FIG. 1. The ground reference potential is distributed by a ground reference potential bus 51 comprising, e.g., a series of conductors connected between the various reference potential input points of information signal processing units 1, 3, 5, 7, 11, 15 and control related units 21, 23 and 25.

Assuming for the moment that bus 51 formed a continuous, closed loop (with separate ground reference potential input terminals 52a and 53b, to be discussed below, replaced by a single terminal) of significant area, then ground bus 51 would be capable of conducting potentially large currents induced in it due to the magnetic fields generated by deflection processing unit 11 and associated deflection coils 13. Since ground bus 51 is typically long, it exhibits relatively large impedances between reference potential input points of the units to which it is connected. As a result, the magnetically induced currents can cause relatively large and variable voltage drops to be developed between the reference potential input points which may adversely affect the operation of the television receiver. For example, such voltage drops in grounding systems have been found to produce noise and beats in the reproduced picture and audio responses. Therefore it is desirable to avoid the use of a continuous, closed loop reference potential of any appreciable area.

One solution would be to ensure that control unit 21 was connected to the ground by only one conductor rather than in the manner shown in FIG. 1 by which control unit 21 is connected to ground by both of bus segments 51a and 51b thereby avoiding the formation of a continuous, closed loop ground path. However, it was found that certain control signals are particularly susceptible to ground disturbances necessitating the loop configuration of ground bus 51. By way of example, it has been found that the tuning error control pulses generated by a phase locked loop which may be included in tuner control unit 27 and the character signals generated by a character generator which may be included in video control portion 29b of receiver control unit 29 are particularly susceptible to ground potential disturbances. Even in the absence of a continuous, closed loop groun path, ground disturbances can be caused in normal operation due to the flow of return currents from the processing units and radiation. Accordingly, it is desirable to connect the ground terminal of control unit 21 to tuner 1 and video processing unit 7 by bus segments 51a and 51b (thereby forming a continuous, closed ground loop) to reduce the ground disturbances due to normal return currents.

In the present grounding arrangement shown in FIG. 1, the otherwise continuous closed ground loop formed by ground bus 51 is broked by partitioning the control unit 21 into first and second control units 27 and 29 and providing separate respective reference potential input terminals 53a and 53b for each of first and second control units 27 and 29 rather than a single reference potential input terminal for all of control unit 21. Reference potential input terminal 53a is connected via bus segment 51a to the reference potential input of tuner 1 and reference potential input terminal 53b is connected via bus segment 51b to the reference potential input of video processing unit 7. Since reference potential input terminals 53a and 53b are not connected, a continuous, closed ground loop subject to the conduction of currents induced from magnetic fields is not formed.

While reference potential terminals 53a and 53b are not directly connected together, a threshold responsive gating circuit 55 is coupled between them to selectively connect them together for conduction and thereby clamp the voltage at one to the other when the voltage between them exceeds a predetermined threshold. The purpose of gating or clamping circuit 55 is to prevent the voltage between potential input terminals 53a and 53b from exceeding a safe limit. Without gating circuit 55, current surges through ground bus 51 due to high energy discharges to ground associated with picture tube 9 may cause excessively large voltages to be developed between terminals 53a and 53b. Since the semiconductor circuits of tuner control unit 27 and of receiver control unit 29 are interconnected by the conductors of data bus 31, the excessively large voltages developed between terminals could be coupled across various semiconductor circuits within units 27 and 29 thereby subjecting them to damage. This is inhibited by gating circuit 55. A bi-directional gating circuit is utilized since the discharges are unpredictable and therefore the polarity of the excessive voltages cannot be predicted.

As shown in FIG. 1, gating circuit 55 includes diodes 57a and 57b connected in parallel between terminals 53a and 53b and poled in opposite senses. In this case, the threshold and clamping voltages are the same in both senses (directions of conduction), e.g., about 0.7 volts. It will be appreciated that diodes 57a and 57b could comprise the base-emitter junctions of bipolar transistors, with the respective collector and base electrodes connected together.

Other gating circuit configurations are possible. As one example, as shown in FIG. 1A, a Zener diode 59 may be employed. In this case, the threshold and clamping voltage in one sense (direction of conduction) is different than in the other sense. That is, if the voltage at terminal 53a exceeds the voltage at terminal 53b, the threshold and clamping voltage is the Zener or reverse conduction voltage of Zener diode 59; and if the voltage at terminal 53b exceeds the voltage at terminal 53a, the threshold and clamping voltage is the forward conduction voltage of Zener diode 59, e.g., about 0.7 volts. Desirably, the Zener voltage is selected to be near as possible, e.g., about 1.2 volts, to the forward voltage. The Zener diode avoids the need for two inventory devices but may in face be more expensive. A Zener diode also tends to act more slowly than a normal diode.

Whatever specific gating circuitry is utilized, the theshold voltage should exceed the highest expected potential between terminals 53a and 53b due to normal operation of the television receiver to ensure that terminals 53a and 53b are not normally electrically connected for conduction currents between them (i.e., that gate 55 is not normally conductive).

To prevent interference between control units 27 and 29 through the power supply path, control unit 21 is provided with separate power supply terminals 61a and 61b for control unit 27 and 29, respectively. Terminals 61a and 61b are desirably bypassed to ground to prevent radiation from control unit by respective bypass capacitors (not shown). If desired, a filter such as a series L-C filter, may be connected between power supply terminals 61a and 61b to enhance the isolation between control units 27 and 29.

While the invention has been described in terms of specific embodiments, the following claims are intended to cover modifications. For example, gating circuits which have different threshold and clamping voltages may be used.

What is claimed is:

1. A display system comprising a picture tube, a deflection unit for generating magnetic fields for deflecting electron beams produced by said picture tube and first and second processing means for processing first and second signals with respect to a reference potential under the control of first and second control signals generated by a control unit with respect to said reference potential, and further comprising:

a reference potential bus for distributing said reference potential distributed around said deflection unit;

first and second interconnected control means within said control unit for generating said first and second control signals, respectively;

each of said first processing means, said second processing means, said first control means and said second control means having a respective reference potential input connected to respective connection points along said reference potential bus; and bi-directional gating means connected between said reference potential inputs of said first and second control means for normally electrically separating said respective connection points for non-conduction therebetween to prevent said reference potential bus distributed around said deflection unit from conducting currents induced in response to magnetic fields produced by said deflection unit and for selectively electrically connecting said respective connection points for conduction therebetween when a voltage of a first plurality between said respective connection points exceeds a first predetermined magnitude and when a voltage of a second polarity, opposite said first polarity, between said respective connection points exceeds a second predetermined threshold to prevent an excessively high voltage of unpredictable polarity due to a high energy discharge associated with said picture tube from being developed across said respective connection points.

2. The system recited in claim 1, wherein:
said first and second control means are substantially contained within the same integrated circuit.

3. The system recited in claim 1, wherein:
said gating means includes a Zener diode.

4. The system recited in claim 1, wherein:
said reference potential is signal ground.

5. The system recited in claim 1, wherein:
said first processing means includes tuner means for tuning varous RF television signals including video and audio information corresponding to respective channels in response to a tuning control signal;
said second processing means is coupled to said tuner means and includes video and audio processing means for processing video and audio signals representing said video and audio information, respectively, corresponding to a channel tuned by said tuner means in response to respective video and audio control signals;
said first control means generates said tuning control signal; and
said second control means generates said video and audio control signals.

6. The system recited in claim 5, wherein:
said first control means includes at least a portion of a phase locked loop; and
said second control means includes a character generator.

7. The system recited in claim 1, wherein:
said gating means includes first and second semiconductor junctions coupled in parallel between said first and second reference potential inputs and poled in opposite senses.

8. The system recited in claim 7, wherein:
said first and second semiconductor junctions comprise the semiconductor junctions of first and second respective diodes.

* * * * *